United States Patent [19]

Chlanda et al.

[11] 4,082,835

[45] Apr. 4, 1978

[54] REMOVAL OF SO₂ FROM GASES

[75] Inventors: Frederick P. Chlanda, Rockaway; Krishnamurthy Nagasubramanian, Parsippany; Kang-Jen Liu, Somerville, all of N.J.

[73] Assignee: Allied Chemical Corporation, Morris Township, N.J.

[21] Appl. No.: 590,777

[22] Filed: Jun. 27, 1975

[51] Int. Cl.² .................. C01B 17/00; B01K 5/00; C01B 17/22; C01B 17/48

[52] U.S. Cl. .................. 423/242; 204/180 P; 423/522; 423/539; 423/166

[58] Field of Search .............. 423/242–244, 423/539, 166, 522; 204/180 P

[56] References Cited

U.S. PATENT DOCUMENTS

| | | | |
|---|---|---|---|
| 2,829,095 | 4/1958 | Oda et al. | 204/180 P |
| 3,475,122 | 10/1969 | McRae et al. | 423/242 X |
| 3,523,755 | 8/1970 | McRae | 204/180 P |
| 3,523,880 | 8/1970 | Parsi | 204/180 P |
| 3,888,750 | 6/1975 | Brecker et al. | 423/539 |
| 3,943,228 | 3/1976 | Dizal et al. | 204/180 P |
| 3,974,258 | 10/1976 | Poitevin et al. | 423/242 |

*Primary Examiner*—O. R. Vertiz
*Assistant Examiner*—Gregory A. Heller
*Attorney, Agent, or Firm*—Arthur J. Plantamura; Roger H. Criss

[57] ABSTRACT

Sulfur dioxide is separated from an aqueous solution containing the same by subjecting the stream to electrodialytic water splitting. In particular a novel method for removing SO₂ from dilute gas streams by means of alkaline solution scrubbing, regeneration of the scrubbing solution and liberation of concentrated SO₂ effected by means of a two-compartment membrane water splitter is provided. Optionally, waste sulfate produced in the process may be converted to sulfuric acid in a separate membrane water splitter or otherwise processed by conventional means.

25 Claims, 7 Drawing Figures

REMOVAL OF SO₂ FROM GASES

BACKGROUND OF THE INVENTION

Environmental considerations preclude burning of fuels with high sulfur content, since the consequent production of sulfur dioxide presents a serious pollution problem. To overcome this, the sulfur in the fuel must be removed prior to, during or after combustion. For users of large quantities of fuel, such as utilities, removal of sulfur after combustion generally has been recognized as most feasible. In this regard, considerable research has been done and a number of processes for removal of sulfur dioxide from the combustion gases have been developed. Among these are lime and limestone scrubbing, magnesium oxide scrubbing, sodium scrubbing with thermal regeneration, e.g. see U.S. Pats. Nos. 3,477,815 and 3,485,581, sodium scrubbing with electrolytic regeneration, e.g. see U.S. Pat. No. 3,475,122, citrate process (U.S. Bureau of Mines (Report of Investigations 7774, (1973)), phosphate process (Stauffer Chemical (Chem. Eng. 81, July 8, pp. 46–47 (1974), the double alkali process, the catalytic oxidation process to make sulfuric acid. A review of these and other processes has been made by A. V. Slack of Noyes Data Corp. ("Sulfur Dioxide Removal from Waste Gases" — Pollution Control Review No. 4 (1971) by A. V. Slack; Noyes Data Corp.; Park Ridge, N.J. 07656).

Many considerations enter into the decision of which type of process might be best. Among these are capital and operating costs, reliability, flexibility in operation, production of useful sulfur products, disposal of by-products, etc.

SUMMARY OF THE INVENTION

This invention is concerned with a new method for recovery of sulfur dioxide from gases containing the same. It relates specifically to selective removal and recovery of sulfur dioxide from a lean gas stream that may contain other acidic gases.

Included among the objects and advantages of the invention are the following:

1. To provide a process that removes $SO_2$ from gas at high efficiencies simultaneously with removal of dust, heat and/or flyash particles contained in the gas. 2. To recover the $SO_2$ in a commercially useful, saleable or otherwise disposable form. 3. To provide complete or substantially complete recovery of the absorbent at moderate temperatures (from 15° C. to 80° C.) without the use of substantial quantities of external heat or addition of processing chemicals. 4. To provide an efficient method for concentrating a relatively dilute stream of $SO_2$. 5. To provide a process that economically regenerates chemicals, substantially through movement of ions which are thermodynamically more easily moved when compared to use of phase change or use of electrode reactions.

Other objects and advantages will be apparent to those skilled in the art from the details that follow.

The invention involves scrubbing the flue gas from a furnace or boiler with an aqueous alkaline solution, e.g.: $Na_2SO_3$, NaOH, a combination of both or any other relatively basic solution. The treated scrubber solution is divided and then treated in a membrane water splitter consisting of cation exchange and bipolar membranes. This operation produces a basic solution which is recycled to the scrubber and an $SO_2$ containing solution. Since the solubility of $SO_2$ in water is low at elevated temperature, the $SO_2$ may be removed from the solution by heating and/or blowing air through it. The sulfate formed in the absorber by oxidation of $SO_2$ by $O_2$, may be removed in a variety of ways, e.g. by further water splitting in a two-compartment cell and liming of the resultant $NaHSO_4$ to precipitate $CaSO_4$ or in a conventional three-compartment membrane water splitter to form $H_2SO_4$ which may be concentrated or limed, or by recovery of $Na_2SO_4$ by evaporation of the $SO_2$-free stream from the stripping operation, or by recovery of $Na_2SO_4$ as Glauber's salt by crystallization.

DESCRIPTION OF THE PREFERRED EMBODIMENTS

Figure 1:
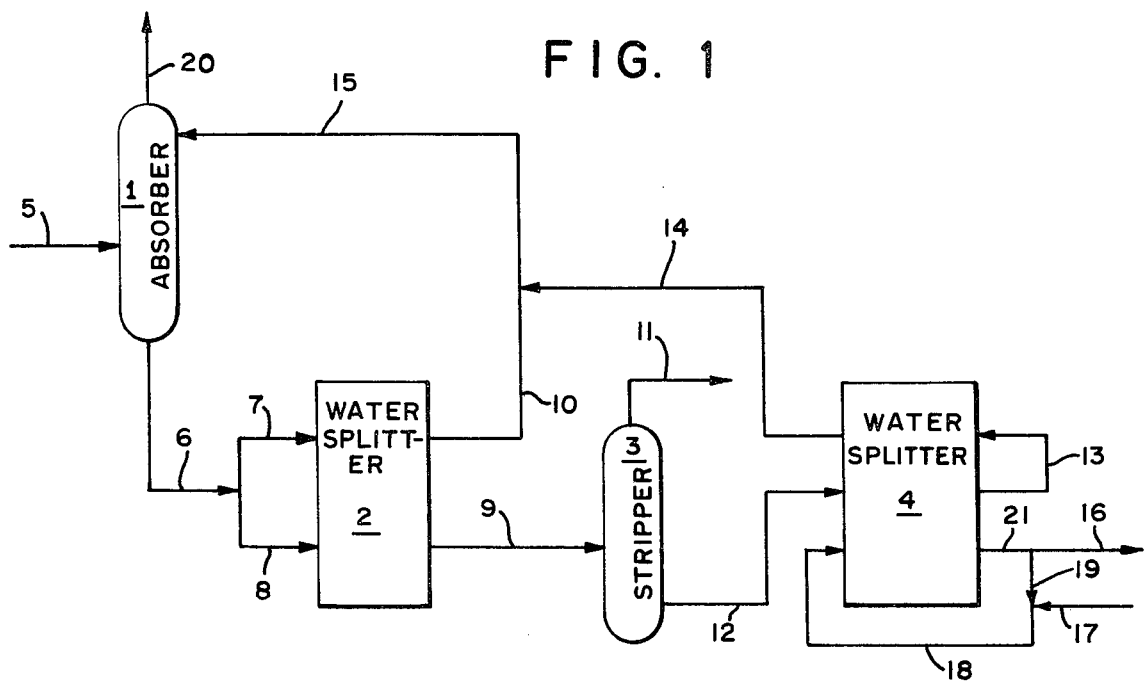
FIG. 1 is a flow sheet of the system for recovery of $SO_2$ in accordance with the invention.

The process may be better understood by reference to the drawing wherein reference numerals accompanied by lower case letters generally refer to similarly functioning elements or alternatives in other figures of the drawing. In FIG. 1 the $SO_2$-rich gas enters the absorber 1 from a stream 5 where it reacts with the basic medium to form a bisulfite, e.g. NaOH to form $NaHSO_3$. In the absorber, oxidation converts some of the sulfur values to $Na_2SO_4$. While sodium is used in this description it is understood that various other cations forming soluble sulfites which are known to those skilled in the art also may be used, e.g., $K^+$, $Li^+$, quaternary ammonium ions such as tetramethyl ammonium, methyl pyridinium, dimethyl piperidium, hydroxyethyldimethyl ammonium and sulfonium ions such as trimethyl sulfonium. Amines which will be protonated by $SO_2$ in water, e.g., ammonia, methylamine, pyridine, dimethylamine and trimethylamine may also be used as the scrubbing medium. Anions other than $OH^-$ may be used to effect scrubbing, such as phosphate, sulfite or carboxylates, e.g. acetate, citrate or oxalate. The invention may be practiced whenever the conversion of a basic compound to a substantially soluble more acidic compound by absorption of $SO_2$ takes place in the absorber, since this absorption can be followed by regeneration of the basic compound and liberation of $SO_2$ by the water splitter as will be described. The absorber used in such an application may be one of a number of types that are well known in the literature. Specifically, a venturi absorber, a plate absorber or a packed tower may be used. The particulates in the incoming gas may be removed in a separate step prior to absorption (as in this embodiment) or the particulate removal may be combined with the absorption step. The temperature of absorption can be between 80° F. and 180° F., preferably, the temperature is between 90° F. and 155° F. The ion concentrations of $Na_2SO_3$, $NaHSO_3$, NaOH, $Na_2SO_4$, $NaHSO_4$ in the scrubbing solutions can vary over a wide range and are limited, in theory, only by their solubilities. The depleted gas stream exits the scrubber as stream 20 and presents no significant pollution problem because most of the $SO_2$ has been removed. The exact composition of stream 6 which contains the absorbed sulfur values will depend on the incoming absorption liquor composition, the design of the absorber, the degree of $SO_2$ removal sought, and the amount of sulfur value converted by oxidation to sulfate.

The reactions occuring in the absorber 1 can be summarized by the following equations:

for NaOH scrubbing —

$$SO_2 + 2NaOH \rightarrow Na_2SO_3 + H_2O$$

$$Na_2SO_3 + SO_2 + H_2O \rightarrow 2NaHSO_3$$

$$Na_2SO_3 + \tfrac{1}{2}O_2 \rightarrow Na_2SO_4 \text{ (side reaction)}$$

for ammonia scrubbing —

$$2NH_3 + SO_2 + H_2O \rightarrow (NH_4)_2SO_3$$

$$(NH_4)_2SO_3 + SO_2 + H_2O \rightarrow 2NH_4HSO_3$$

$$2NH_3 + SO_2 + \tfrac{1}{2}O_2 + H_2O \rightarrow (NH_4)_2SO_4 \text{ (side reaction)}$$

for acetate scrubbing —

$$NaOAc + SO_2 + H_2O \rightarrow NaHSO_3 + HoAc$$
$$2NaOAc + SO_2 + \tfrac{1}{2}O_2 \rightarrow Na_2SO_4 + 2HoAc \text{ (side reaction)}$$

Similar equations can be written for other scrubbing media. The sulfur value rich stream 6 from the absorber is split into two streams which feed a two-compartment water splitter, 2. Details of the operation of this water splitter will be provided in conjunction with the description accompanying FIG. 2.

The two-compartment water splitter 2 incorporates a plurality of cation and bipolar ion exchange membranes arranged in an alternating fashion between two electrodes thus forming an electrodialysis stack. The construction of electrodialysis stacks is well known and, for example, units are available commercially from Asahi Glass Co., 1-2, Marunochi 2-chome, Chiyoda-ku, Tokyo, Japan; Ionics, Inc., Watertown, Massachusetts and other commercial sources. In general, stacks which are suitable for electrolyte concentration such as the Asahi Model CU-IV, may be used for the water splitter. However, the membrane used therein must be of a kind adaptable to water splitting. While the use of bipolar membranes is to be preferred because of the simplicity of equipment, the water splitting operation may be carried out by using a third compartment containing anions or cations incapable of passing through the anion and cation membranes on either side of the compartment as described, for example, in U.S. Pats. Nos. 3,704,218 and 3,705,846. This arrangement when used for water splitting operates by the same principles as the bipolar membrane. The two compartment water splitter or its equivalent converts water into hydrogen and hydroxyl ion. The water splitter employs suitable bipolar membranes, that can be of the type described, for example, in U.S. Pat. No. 2,829,095, which has reference to water splitting generally, or any other type which effectively converts water into hydrogen and hydroxyl ions.

Figure 2:
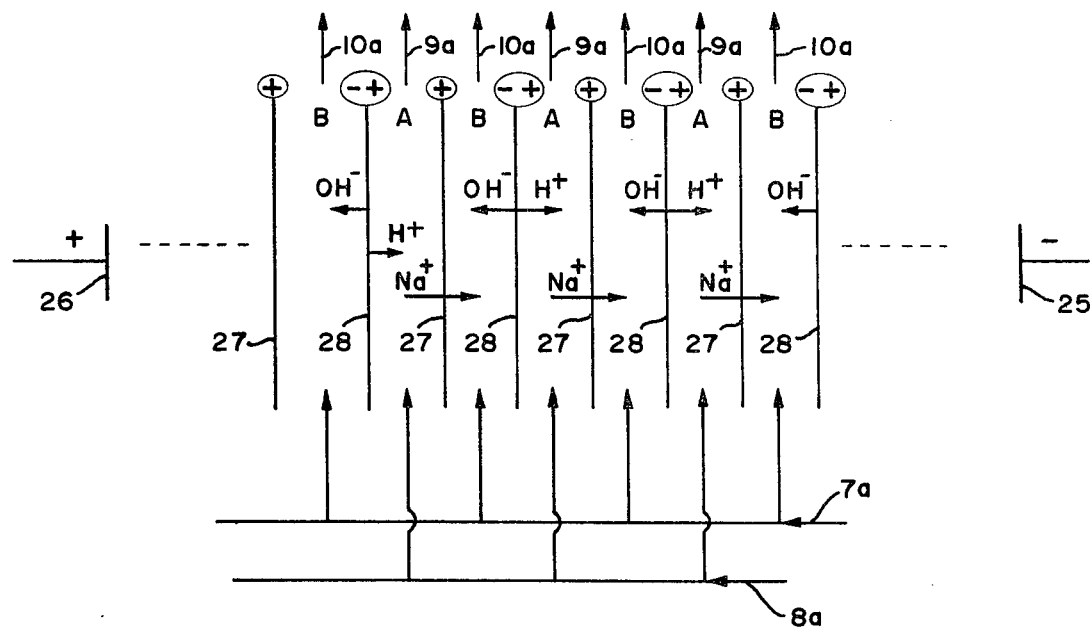
FIG. 2 is a diagrammatic illustration of a membrane stack which may be employed for two compartment water splitting in accordance with the invention.

The operation of the water splitter which is further described by reference to FIG. 2, is essentially as follows: A direct current passes from the anode 26 to the cathode 25. Stream 8a which contains $NaHSO_3$ and $Na_2SO_4$ from the absorber is fed to the compartments labeled A. In compartments A, hydrogen ion, $H^+$, from the bipolar membranes 28 is introduced. At the same time, cations migrate to the B compartments through the cation membranes 27. Since $SO_2$ is a weak acid, the concentration of $H^+$ ion in the A compartments is low until all of the $HSO_3^-$ ion is converted to $SO_2$. This promotes the effective transport of $Na^+$ ion (relative to $H^+$ ion) across the cation membrane. The presence of some $Na_2SO_4$ in stream 8 is a benefit to the effectiveness since it raises the ratio of $Na^+/H^+$ ions in the A compartments. The other portion 7a of the stream from the absorber (shown as numeral 7 in FIG. 1) is fed to the B compartments of the two compartment water splitter which is illustrated in detail in FIG. 2. The $OH^-$ ion from the bipolar membrane reacts with any $HSO_3^-$ ion in the stream to form $SO_3^=$ ion with a substantially neutral charge being maintained by the incoming flux of $Na^+$ ions from the A compartments. When all of the $HSO_3^-$ ion has reacted, NaOH will be produced. The composition of the base stream will, therefore, depend on the relative amounts of stream 6 from the scrubber introduced into the A and B compartments as stream 8a and 7a respectively, and may be essentially all NaOH, $Na_2SO_3$, mixtures of NaOH and $Na_2SO_3$ or $NaHSO_3/Na_2SO_3$ mixtures. The conversion of the solution may be made in a single pass through the stack or by a feed and bleed apportionment method or by passing the solutions through a series of stacks so that the solubility of $SO_2$ in water is not exceeded and no gas is formed inside the water splitting stack. The operation of the water splitter with the pressure on the solutions greater than atmospheric may also help prevent the formation of $SO_2$ gas inside the stack.

The reactions in the water splitter are schematically represented by the following equations:

Acid Compartment:
for NaOH/$Na_2SO_3$ scrubbing —
$$NaHSO_3 + H^+ - Na^+ \rightarrow H_2SO_3$$

$$H_2SO_3 \rightleftarrows H_2O + SO_2$$

for ammonia scrubbing —
$$NH_4HSO_3 + H^+ - NH_4^+ \rightarrow H_2SO_3$$

$$H_2SO_3 \rightleftarrows H_2O + SO_2$$

for acetate scrubbing —
$$NaHSO_3 + HOAc + H^+ - Na^+ \rightarrow H_2SO_3 + HOAc$$

$$H_2SO_3 \rightleftarrows H_2O + SO_2$$

Base Compartment:
for NaOH/$Na_2SO_3$ scrubbing —
$$NaHSO_3 + Na^+ + OH^- \rightarrow Na_2SO_3 + H_2O$$

$$Na^+ + OH^- \rightarrow NaOH$$

for ammonia scrubbing —
$$NH_4HSO_3 + NH_4^+ + OH^- \rightarrow (NH_4)_2SO_3 + H_2O$$

$$NH_4^+ + OH^- \rightarrow NH_4OH$$

for acetate scrubbing —

$$NaHSO_3 + HOAc + Na^+ + OH^- \rightarrow NaHSO_3 + NaOAc + H_2O$$

$$NaHSO_3 + NaOAc + HO + Na^+ + OH^- \rightarrow Na_2SO_3 + NaOAc + 2H_2O$$

$$Na^+ + OH^- \rightarrow NaOH$$

Net Reactions:
for $NaOH/Na_2SO_3$ scrubbing —

$$2NaHSO_3 \rightarrow H_2O + SO_2 + Na_2SO_3$$

$$NaHSO_3 \rightarrow NaOH + SO_2$$

for ammonia scrubbing —

$$2NH_4HSO_3 \rightarrow H_2O + SO_2 + (NH_4)_2SO_3$$

$$NH_4HSO_3 \rightarrow SO_2 + NH_4OH$$

for acetate scrubbing —

$$3NaHSO_3 + HOAc \rightarrow NaOAc + Na_2SO_3 + 2SO_2 + 2H_2O$$

$$NaHSO_3 \rightarrow NaOH + SO_2$$

In the above equations, only the decompositions of bisulfite in the feed stream 6 has been shown. In practice, the feed to the water splitter might consist of a mixture of sulfite and bisulfite. The sulfite will undergo water splitting as illustrated by the reactions below.
Acid Compartment:

$$Na_2SO_3 + 2H^+ - 2Na^+ \rightarrow H_2SO_3$$

$$H_2SO_3 \rightleftharpoons H_2O + SO_2$$

and similar equations for other systems.
Base Compartment:

$$2Na^+ + 2OH^- \rightarrow 2NaOH$$

Net Reaction:

$$Na_2SO_3 + H_2O \rightarrow 2NaOH + SO_2$$

In a like manner similar equations can be written for other scrubbing systems.

A significant advantage is provided in using a membrane water splitter for regenerating the spent sulfite liquor because the process involves no phase change, except for the evolution of $SO_2$ from $H_2SO_3$ solutions and requires only a small energy input. Furthermore, the process of the invention has a high efficiency and can be operated at any convenient temperature, e.g. within the broad range of about 50° F. to about 170° F. but more practically and preferably between about 70° F. and 130° F.

Electrolysis is not as effective as water splitting for this process. The main difference between electrolysis to produce acid and base from salt and water and electrodialytic water splitting by membranes to carry out the same process is that electrolysis generates $H^+$ and $OH^-$ ions at the electrodes only and, at the same time, generates $H_2$ and $O_2$ (or other electrode oxidation and reduction products). For electrolysis, each equivalent of $H^+$ and $OH^-$ generated will result in an equivalent amount of $H_2$ and $O_2$ (or other oxidation and reduction products) being produced.

Water splitting, on the other hand, generates, $H^+$ and $OH^-$ ions from each of the several bipolar membranes between the electrodes without forming $H_2$ and $O_2$ (except for the relatively limited quantity of $H_2$ and $O_2$ at the electrodes which are the only places where oxidation-reduction is taking place). Therefore, in water splitting oxidation-reduction products are formed in only small amounts relative to the total amount of $H^+$ and $OH^-$ formed at the bipolar membranes. In general, the process of electrolysis requires more energy than does water splitting since the energy required to produce $H_2$ and $O_2$ from water in electrolysis must be supplied in addition to the energy needed to produce $H^+$ and $OH^-$ from water. In addition to the higher energy consumption for electrolysis, in the system of the present invention, the electrolysis of sulfite and bisulfite solutions is known to produce mostly undesirable products such as dithionate and sulfate at the anode, see for example the Bureau of Mines, Information Circular 7836 (1958), p 48.

As shown in FIG. 1, the processed solution 10 from the B compartments of stack 2 is recycled to the absorber 1. The solution from the A compartments (FIG. 2) exits the water splitter as stream 9. Stream 9 consisting primarily of $Na_2SO_4$, $SO_2$ and water is introduced into stripper 3 where it is heated and the dissolved $SO_2$ liberated and collected as stream 11. The concentrated $SO_2$ in stream 11 may be converted to sulfur or sulfuric acid or compressed and recovered as liquid $SO_2$ by known technology.

$SO_2$ may also be recovered from stream 9 by blowing air through the solution, eliminating the need for heating the solution. The mixture of $SO_2$, $N_2$, $O_2$ obtained from this operation would be suitable for the manufacture of sulfuric acid.

Another method of obtaining $SO_2$ from stream 9, FIG. 1, would be to pressurize the stream and obtain liquid $SO_2$ as the overhead product from a distillation column. Alternatively, the fractionation may be carried out under reduced pressure at ambient temperatures and the evolved $SO_2$ liquefied by compression. It is apparent that various other methods of removing $SO_2$ from the $SO_2$-rich stream 9 known to those skilled in the art may also be used.

Figure 3:
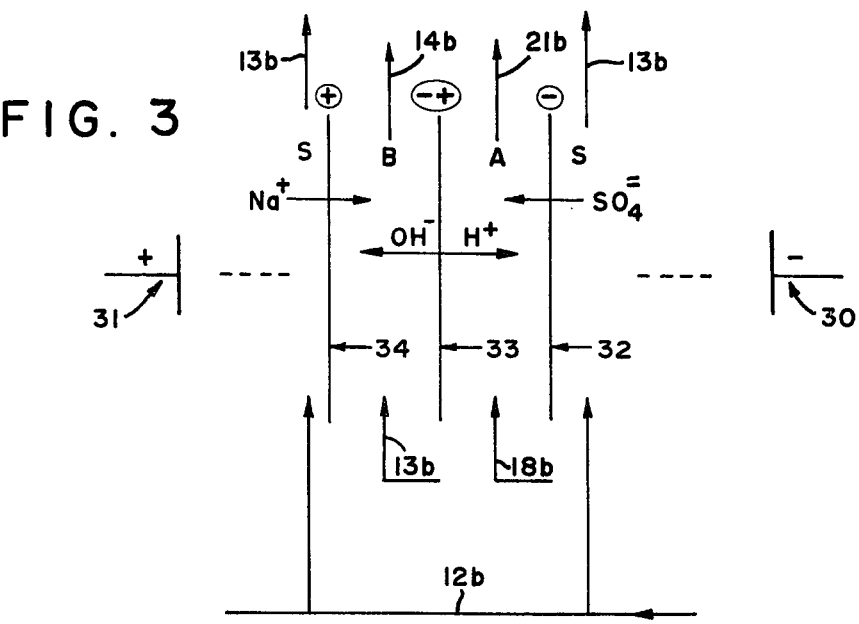
FIG. 3 is a fragmentary diagram of a unit cell from a conventional water splitter system.

Stream 12 from the bottom of stripper 3 consists essentially of aqueous $Na_2SO_4$. In order to purge sulfate formed by oxidation in the process, stream 12 may be treated in a three-compartment water splitter of the conventional type, for example, apparatus of the kind described in U.S. Pat. No. 2,829,095 or in U.S. Pats. Nos. 3,704,218 and 3,705,846 and depicted diagrammatically as 4 in FIG. 1. A unit cell from the water splitter 4 is illustrated in greater detail in FIG. 3. A series of membranes, as seen by reference to FIG. 3, cation 34, bipolar 33, anion 32, are placed between an anode 31 and a cathode 30 forming a series of three chambers designated S, B and A. The $Na_2SO_4$ stream 12b is fed to the S chambers where under the action of a direct current, its concentration is reduced by migration of $Na^+$ ions to the B compartments and by migration of $SO_4^=$ ions to the A compartments. The depleted $Na_2SO_4$ exiting from the S compartments of water splitter 4, stream 13 (see FIG. 1) may be introduced into the B compartments to receive NaOH which exits from water splitter 4 as stream 14 and is returned to the absorber 1. Into the water splitter 4, as shown in FIG. 1, water (stream 17) and some recycled acid (stream 19) are introduced as stream 18 into the acid compartments of the water splitter 4 where the concentration of $H_2SO_4$ is increased and leaves the water splitter as stream 21. A portion (Stream 16) of stream 21 can then be concentrated further, disposed of in a manner known in the art or utilized as is. Only enough NaOH and $H_2SO_4$ are produced in the water splitter 4 to remove the $SO_4^=$ ions formed by oxidation and maintain a constant amount of recycle sulfate to the absorber.

The net reaction in the three-compartment water splitter is:

| $Na_2SO_4$ + (salt compartment S) | $2H^+ + 2OH^- \rightarrow$ (from bipolar membrane) | $2NaOH +$ (base compartment B) | $H_2SO_4$ (acid compartment A) |
| --- | --- | --- | --- |

Figure 4:
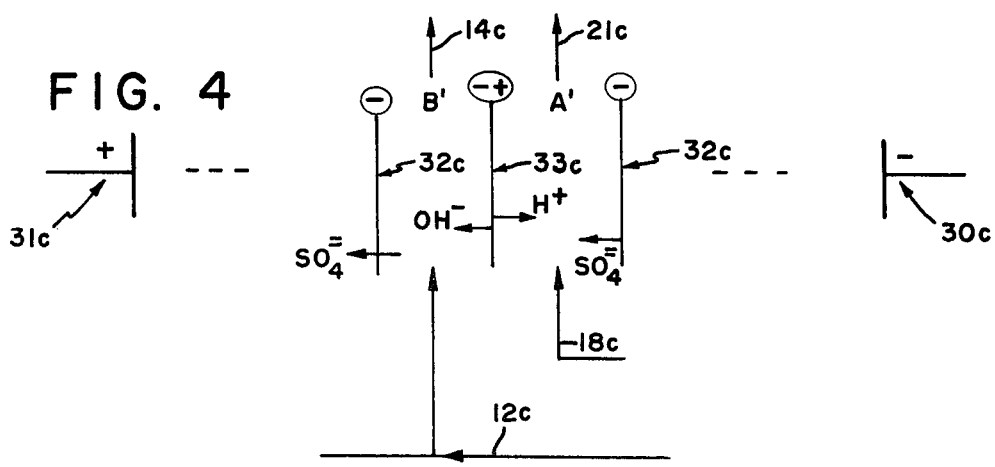
FIG. 4 is a fragmentary diagram of a unit cell for regenerating acid and base from weak base scrub liquors.

If a weak base such as ammonia is used in scrubbing, the removal of sulfate may be achieved more simply. The three-compartment water splitter can be replaced by a two-compartment water splitter, consisting of bipolar and anion membranes. A unit cell from such a water splitter is illustrated in FIG. 4. A series of membranes, bipolar 33c and anion 32c are placed between an anode 31c and a cathode 30c forming a series of two chambers designated B' and A'. A stream of $(NH_4)_2SO_4$ from the stripper 3 in FIG. 1 is fed to the base (B') compartments as stream 12c. Because of the relative abundance of sulfate ions, $SO_4^=$ is transferred across the anion membranes, in preference to the $OH^-$ ions. In the A' compartments, these sulfate ions combine with the $H^+$ ions generated by the bipolar membranes, to yield $H_2SO_4$. Stream 18c (18 in FIG. 1) is used to pick up the sulfuric acid. The more concentrated sulfuric acid exits this water splitter as stream 21c (21 in FIG. 1). The reactions occurring are:

Base Compartments (B')
$(NH_4)_2SO_4 + \quad OH^- \rightarrow NH_4OH \quad + SO_4^=$
$\quad\quad\quad\quad$ (from bipolar $\quad\quad\quad\quad$ (goes through
$\quad\quad\quad\quad$ membrane) $\quad\quad\quad\quad\quad$ anion membrane)

Acid Compartment (A')
$2H^+ + SO_4^= \rightarrow H_2SO_4$

Net Reaction
$(NH_4)_2SO_4 + 2H^+ + 2OH^- \rightarrow 2NH_4OH + H_2SO_4$

Figure 5:
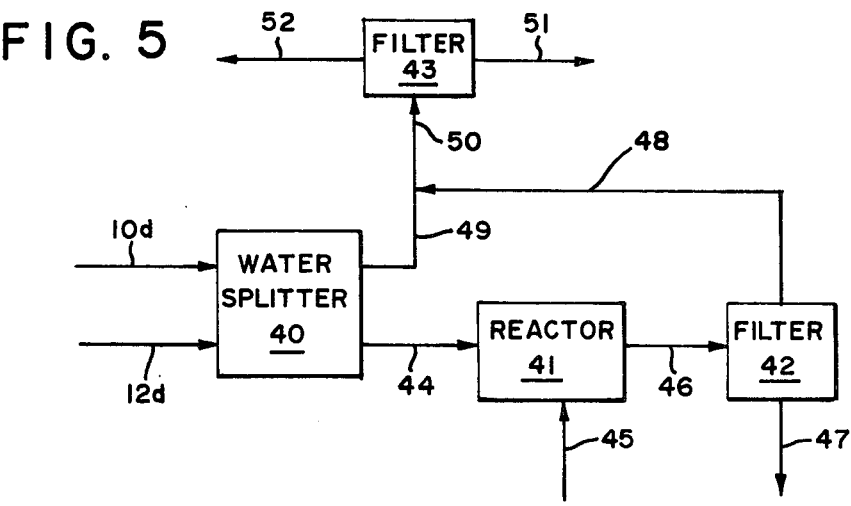
FIG. 5 is a part of a flow sheet of an alternate embodiment employing chemical conversion for purging sulfate ion from the system in accordance with the invention.

Another method of purging $SO_4^=$ ion from the system is described by reference to FIG. 5. The $Na_2SO_4$ solution from the stripper 3 (of FIG. 1) shown in FIG. 4 as stream 12d (the whole or a portion of the stream 12 from FIG. 1) is fed to the acid side of a two-compartment water splitter 40. A conversion from $Na_2SO_4$ to $NaHSO_4$ occurs in a manner analogous to the conversion of $NaHSO_3$ to $H_2SO_3$ which occurs in the water splitting operation described in conjunction with FIG. 2. Enough acidity is introduced into the $Na_2SO_4$ fed into splitter 40 so that in the subsequent reactions, the required amount of sulfate is removed. Additional base is generated on the base side of the water splitter. Stream 10d is used to pick up the base generated. This stream can be a portion of stream 10 or 6 from FIG. 1.

The water splitter reactions are:
Acid Compartment $$Na_2SO_4 + H^+ - Na^+ \rightarrow NaHSO_4$$

Base Compartment $$Na^+ + OH^- \rightarrow NaOH$$

$$NaHSO_3 + NaOH \rightarrow Na_2SO_3 + H_2O$$

Net Reactions $$Na_2SO_4 + NaHSO_3 \rightarrow NaHSO_4 + Na_2SO_3$$

$$Na^+ + OH^- \rightarrow NaOH$$

Similar equations can be written for other scrubbing systems. The $Na_2SO_4/NaHSO_4$ solution from the water splitter 40, stream 44, is reacted at 41. Lime or limestone is introduced in stream 45. The slurry, stream 46, consisting of dissolved $Na_2SO_4$, small amounts of dissolved $Ca(OH)_2$ and a precipitate of $CaSO_4$ is filtered at 42 and the sulfate removed at 47 from the system as solid $CaSO_4$ or $CaSO_4 \cdot 2H_2O$. The sodium sulfate stream 48 may be treated with $Na_2CO_3$ or $CO_2$ to reduce the concentration of soluble $Ca^{++}$ ion by precipitating $CaCO_3$ which can then be filtered or the stream 48 can be mixed with stream 49 from water splitter 40 which results in the formation of a small amount of $CaSO_3$ which is separated in filter 43. The $CaSO_3$ removed at 51 is disposed of and the alkaline solution 52 is returned to the absorber 1 of FIG. 1.

Instead of a separate water splitter to convert $Na_2SO_4$ to $NaHSO_4$ the conversion may be carried out in water splitter 2 (FIG. 1) before introducing the stream 9 to the $SO_2$ stripper 3. In this case, stream 12 will be a mixture of $Na_2SO_4$ and $NaHSO_4$ and may be treated with lime without further acidification by water splitting.

Figure 6:
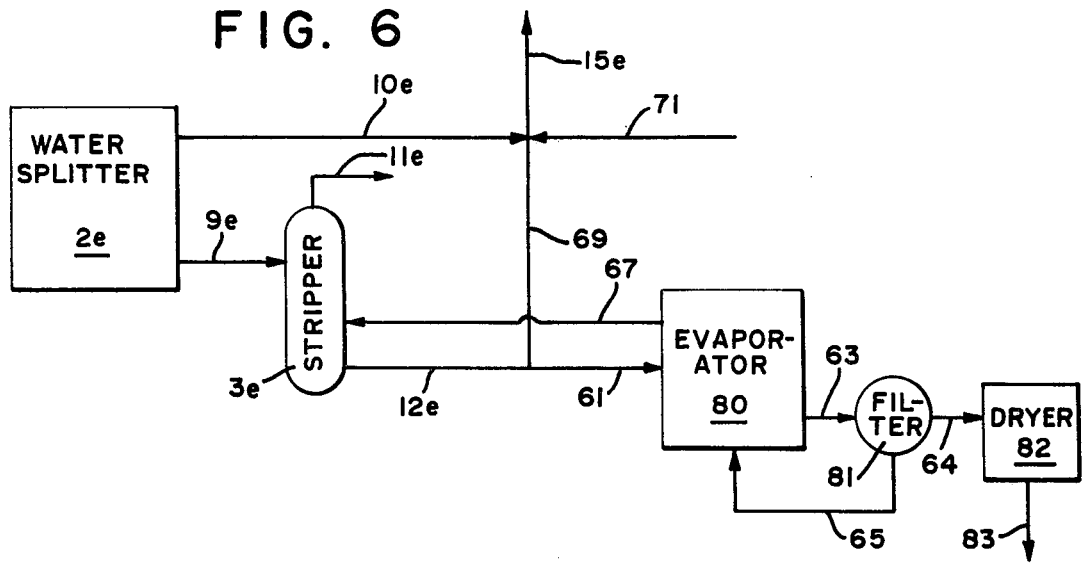
FIG. 6 is a flow sheet for another method for purging sulfate from the system employing evaporation.

Another method for purging sulfate from the system is by evaporation of the $Na_2SO_4$ solution from the stripper. This type of purging process will be described in conjunction with FIG. 6. As shown in FIG. 6, the $SO_2$-rich stream 9e from the water splitter 2e (the latter designated 2 in FIG. 1) is introduced into the stripper 3e where $SO_2$ (11e) is removed by heating. The sodium sulfate solution withdrawn at 12e is then divided. One part 69 is returned to the absorber (1 in FIG. 1); the other part of the divided stream 61 is concentrated in evaporator(s) 80; the slurry from the evaporator stream 63, is filtered in filter 81 and the solid $Na_2SO_4$ dried at 82 and recovered at 83 for sale or disposal while the saturated solution from the filter 81, stream 65, is returned to the evaporator 80. Steam may be recovered from the evaporator as shown at 67 and may be used for heating in the stripper 3e. It may be advantageous also in some cases to divide stream 9e (not shown in FIG. 6) before introduction to the $SO_2$ stripper so that two strippers are employed; one of which can be operated by direct steam injection and the other of which uses a heat exchanger and provides the $Na_2SO_4$ stream to be evaporated. This type of operation makes use of the efficient heating method of direct steam injection without diluting with condensed steam the stream which is to be evaporated.

When $Na_2SO_4$ is produced, the $Na^+$ ion and base values equivalent to the amount of $SO_4^=$ produced are lost and must be made up. This may be effected by the addition of $Na_2CO_3$, $NaHCO_3$, $Na_2SO_3$, $NaHSO_3$ or NaOH (stream 71) to stream 10e from the B compartments of the water splitter 2e before returning to the absorber as stream 15e (15 in FIG. 1).

Alternatively, the make-up $Na_2SO_3$, $NaHSO_3$, $NaHCO_3$, $Na_2CO_3$ initially can be decomposed in a two compartment water splitter, thereby generating NaOH and $SO_2$ (or $CO_2$). The base so generated can be fed as stream 71 to stream 10e. The $SO_2$ (or $CO_2$) generated can then be recovered or suitably disposed of.

Figure 7:
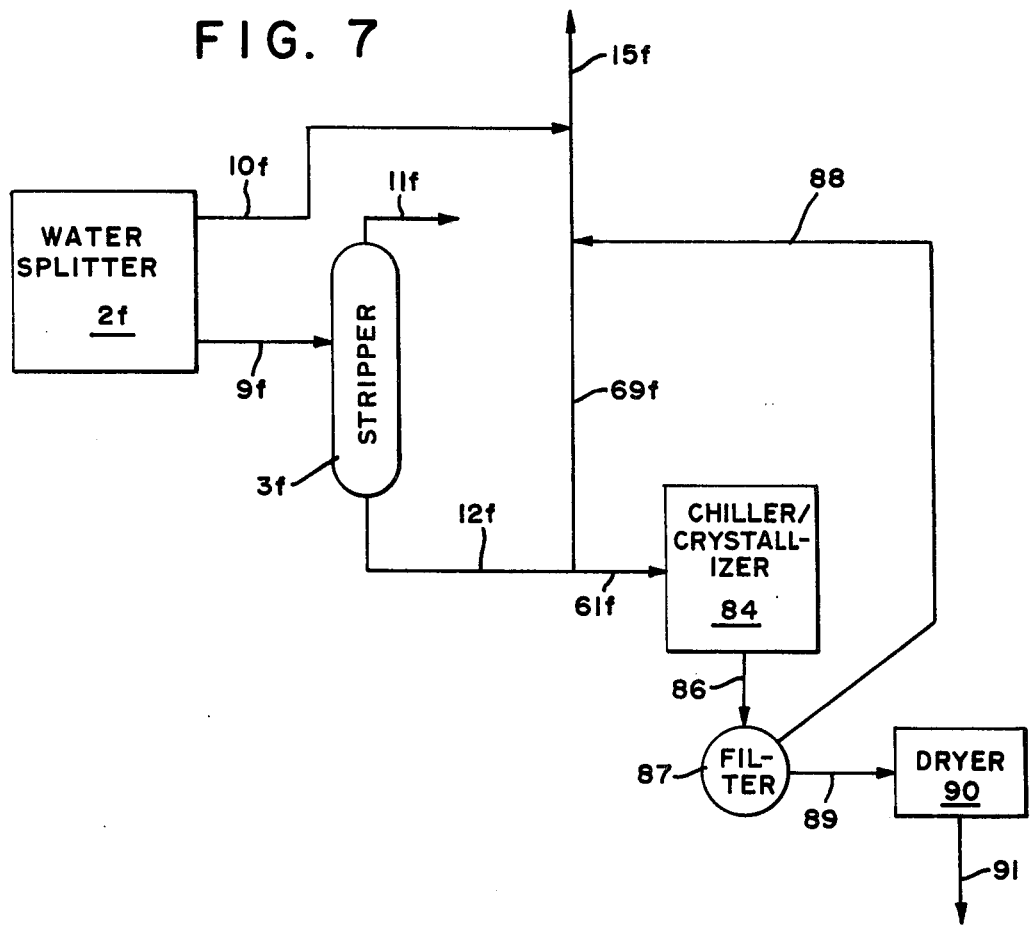
FIG. 7 is a flow sheet of still another embodiment for removal of sulfate which involves cooling a portion of the stripper bottoms and crystallizing therefrom the sulfate salt.

Another method for purging sulfate from the system is by cooling a portion of the $Na_2SO_4$ from the stripper, i.e. the stream shown at 12e in FIG. 6 and also as 12f in FIG. 7. This is described by reference to FIG. 7 wherein a portion 61f of the stripper bottoms, 12f, is chilled and the sodium sulfate crystallized out in a chiller crystallizer, 84. The mother liquor 86, after removing the sodium sulfate crystals as Glauber's salt at 87 is returned to $SO_2$ absorber (not shown) as stream 88, along with stream 69f. The Glauber's salt that is crystallized out at 89 can subsequently be dried as shown at 90 and sold as sodium sulfate. The sodium which is lost from the system must be made up as $Na_2CO_3$ $NaHCO_3$, $Na_2SO_3$, $NaHSO_3$ or NaOH.

Additional modifications of the process will be apparent to those skilled in the art within the scope of the essence of the invention herein set forth involving the liberation of $SO_2$ from the exhausted scrubber solution and regeneration of fresh scrubber solution by two compartment water splitting.

The invention will be further illustrated by reference to the following examples the details of which should not be construed as limiting the invention except as may be required by the appended claims.

EXAMPLE 1

The efficiency of base and $SO_2$ production from solutions resembling those which would be obtained from the absorber were determined in laboratory electrodialysis units. The units consisted of a platinum anode, a C-322* (AMF) cation membrane, another C-322 cation membrane, a bipolar membrane with the anion permeable side facing the anode, another C-322 membrane and a platinum anode. The membranes were held in place and separated by polyfluorocarbon cylinders of inside diameter 3.7 cm which contained ports for pumping the solutions to the 1.5 cm thick solution compartments formed by the cylinder and the membranes. A cell with five compartments was thereby formed, the compartments being anolyte, acid, base, acid and catholyte. The solutions were pumped from reservoirs, through the cell, and returned to the reservoir. The anolyte and catholyte were supplied from a common reservoir as were the acid compartments. The reservoir supplying the central (base) compartment was calibrated so that the volume of solution in this part of the system could be accurately determined.

*available commercially from AMF, Inc., Stamford, Conn.

The base compartment was charged with a solution made up by dissolving 300 g $Na_2SO_3$, 50 g $Na_2S_2O_5$, 57 g $Na_2SO_4$ in 587 g of $H_2O$. Analysis of this solution indicated that the initial base solution was 0.489M $NaHSO_3$. The acid compartment was charged with 500 ml of a solution 0.366M in $SO_2$, 0.489M in $NaHSO_3$ and about 0.5M in $Na_2SO_4$. The electrolyte solution was 1 liter of 0.5M $Na_2SO_4$. A direct current of 1.0 ampere was passed for a total of 10,000 sec. The volume of the base solution increased from 129.5 ml initially to 139 ml. After the passage of current, the composition of the acid was 0.478 M $SO_2$, 0.336M $NaHSO_3$ (no attempt was made to contain all of the $SO_2$ generated). Analysis of the base compartment indicated that no $NaHSO_3$ remained and that the solution was 0.173M in NaOH. The overall efficiency for base production (i.e., loss of $NaHSO_3$ and gain of NaOH) was 84%.

EXAMPLE 2

A cell similar to that used in Example 1 was employed. The base compartment was charged with 105 ml of 0.1027N KOH. The acid compartments were charged with 1 liter of solution containing 0.4M $KHSO_3$, 0.3M $H_2SO_3$ and 0.5M $K_2SO_4$ (total acidity = 1.07N). The electrolyte compartments were charged with 1 liter of 0.25M $K_2SO_4$. A direct current of 1.0 ampere was passed for 6,000 sec. The volume of the base solution increased to 108.4 ml. Analysis of the base showed that the solution was 0.540M KOH and 0.019M $K_2SO_3$ so the current efficiency was 76% for $OH^-$ production. The total acidity of the acid compartment increased to 1.11N (no attempt was made to contain all the $SO_2$ generated).

EXAMPLE 3

An electrodialysis unit similar to that described in Example 1 was used except that the order of membranes (from the anode side) was C-322, bipolar, C-322, C-322. The compartments thus formed were anolyte, base, acid, base, catholyte. The acid compartment was fed from a reservoir calibrated so the volume of that portion of the system could be accurately determined.

The acid compartment was charged with 170 ml of a solution 1.680M in $NaHSO_3$ and about 0.5M of $Na_2SO_4$ and closed to minimize the loss of $SO_2$. The base compartment was charged with 483 ml. of 0.1012M NaOH. The current was 0.85 ampere for 12,000 sec. During the passage of current, the volume of the acid compartment was kept constant at 170 ml by adding $H_2O$. After the passage of current, the acid compartment was 1.150M $NaHSO_3$ and 0.458M in $SO_2$. The volume of the base following the run was 490 ml of solution which was 0.2530M in NaOH and 0.0093M in $Na_2SO_3$. The efficiency for $SO_2$ production, therefore, was 74% and for NaOH 71% based on the current passed.

EXAMPLE 4

In an apparatus similar to that described for Example 3, the base compartment was charged with 600 ml of 0.25M $NaHSO_3$ and the acid compartment with 1M $Na_2SO_4$. The current was commenced at 1.0 amp. At time intervals shown in Table I, 2 ml samples were withdrawn and the concentration of acid determined. From the concentration measurement and the volume change, the current efficiency during the interval was determined.

TABLE I

| Time Interval (sec.) | $V_o$ (ml) | $V_f$ (ml) | Acidity at end of interval (M) | % current efficiency for the interval |
|---|---|---|---|---|
| 0–2000 | 150.5 | 147.1 | .1388 | 99 |
| 2000–4000 | 145.1 | 143.5 | .2652 | 86 |
| 4000–6000 | 141.5 | 140.5 | .3922 | 85 |
| 6000–8000 | 138.5 | 137.5 | .5114 | 77 |
| 8000–9200 | 135.5 | 134.5 | .5826 | 73 |

The acidity of the base compartment decreased to about 0.1M during the passage of current.

EXAMPLE 5

A typical mass flow for the streams in FIG. 1 is given in Table II below. The mass flow given is provided to help clarify the operation of the process and does not necessarily reflect optimum or realizable conditions for the operation of the process.

TABLE II

| Stream # | Na$_2$SO$_4$ | Na$_2$SO$_3$ | NaHSO$_3$ | NaOH | SO$_2$ | O$_2$ | H$_2$SO$_4$ | H$_2$O |
|---|---|---|---|---|---|---|---|---|
| 5* | | | | | | | | |
| 6 | 4,262 | 1,261 | 18,733 | | | | | 79,755 |
| 7 | 2,244 | 664 | 9,859 | | | | | 41,975 |
| 8 | 2,018 | 597 | 8,874 | | | | | 37,780 |
| 9 | 2,018 | | | | 5,765 | | | 33,000 |
| 10 | 2,244 | 12,605 | | | | | | 48,380 |
| 11 | | | | | 5,765 | | | |
| 12 | 2,018 | | | | | | | 33,000 |
| 13 | 596 | | | | | | | 32,820 |
| 14 | 596 | | | 800 | | | | 32,820 |
| 15 | 2,840 | 12,605 | | 800 | | | | 81,200 |
| 16 | | | | | | | 981 | 8,830 |
| 17 | | | | | | | | 9,009 |
| 18 | | | | | | | 981 | 17,839 |
| 19 | | | | | | | 981 | 8,830 |
| 20* | | | | | | | | |
| 21 | | | | | | | 1,962 | 17,660 |

*It has been assumed that 6406 parts of SO$_2$ are absorbed from gaseous stream 5 and that 160 parts of O$_2$ have been consumed.

All other components in stream 5 exist in stream 20.

We claim:

1. A method for removing SO$_2$ from a gas which comprises:
   (a) absorbing SO$_2$ from said gas by contact with a basic aqueous solution thereby forming an aqueous SO$_2$-containing salt solution in which soluble sulfites and bisulfites are present;
   (b) dividing said solution into two streams A and B;
   (c) subjecting said streams to electrodialytic water splitting in a two-compartment water splitter comprised of alternating cation and bipolar membranes wherein one of said streams is introduced into the water splitter compartments between the cation membranes and the anion sides of the bipolar membranes;
   (d) introducing the other stream, A, into the compartments of said splitter between the cation sides of the bipolar membranes and the cation membranes;
   (e) passing a direct current through the water splitter thereby effecting the acidification of the stream A and the basicification of the stream B and the transfer of cations from stream A to stream B and producing an aqueous SO$_2$ containing solution derived from stream A and a solution comprised of base capable of absorbing SO$_2$ derived from stream B.

2. The process of claim 1 in which the scrubbing solution contains as a source of supporting electrolyte, a salt selected from the group consisting of sodium, potassium and ammonium.

3. The process of claim 2 in which the supporting electrolyte salt is a sulfate.

4. The process of claim 1 in which the gas from which SO$_2$ is removed is the combustion gas from a boiler which burns a sulfur containing fuel.

5. The process of claim 1 in which the gas from which SO$_2$ is removed is the effluent from a sulfuric acid plant.

6. The process of claim 1 in which the gas from which SO$_2$ is removed is the effluent from a smelter.

7. The process of claim 1 in which the basic aqueous solution contains sodium ion.

8. The process of claim 1 in which the basic aqueous solution contains potassium ion.

9. The process of claim 1 in which the basic aqueous solution contains ammonium ion.

10. The process of claim 1 comprising the further step of separating the SO$_2$ from the SO$_2$ containing solution obtained from the water splitter by heating the effluent and volatilizing the SO$_2$.

11. The process of claim 1 comprising the further step of separating the SO$_2$ from the SO$_2$ containing solution obtained from the water splitter by passing air through the stream to remove the SO$_2$.

12. The process of claim 1 comprising the further step of separating the SO$_2$ from the SO$_2$ containing solution obtained from the water splitter by subjecting it to fractional distillation under pressure to recover liquid SO$_2$.

13. The process of claim 1 wherein SO$_2$ is recovered from the SO$_2$ containing solution obtained from the water splitter by fractionation under subatmospheric pressure.

14. The process of claim 1 in which a pressure greater than atmospheric is maintained in the water splitter thereby enhancing the solubility of the SO$_2$.

15. The process of claim 10 in which sulfate produced in step (a) is purged from the water splitter effluent subsequent to removal of SO$_2$ by subjecting said effluent to water splitting in a three-compartment water splitter containing cation, anion and bipolar membranes to generate H$_2$SO$_4$ and base.

16. The process of claim 10 in which sulfate produced in step (a) is purged, in the case of a weak base scrubbing solution, by subjecting the water splitter effluent subsequent to removal of SO$_2$, to water splitting in a two-compartment water splitter containing alternating bipolar and anion membrane to produce sulfuric acid and base streams.

17. The process of claim 10 in which the sulfate produced in step (a) and present in the effluent from the water splitter after removal of SO$_2$ is converted, by subjecting this effluent to water splitting in a two-compartment water splitter containing alternating cation and bipolar membranes, to bisulfate and base streams.

18. The process of claim 17 in which the bisulfate stream is subsequently treated with a base, selected from calcium and barium that forms an insoluble sulfate, to effect a conversion of the bisulfate to calcium sulfate and soluble sulfate and lessening the respective residual calcium or barium concentration in solution by further treatment of the solution with a carbonate or sulfite.

19. The process of claim 10 in which the sulfate produced in step (a) and present in the effluent from the water splitter subsequent to removal of SO$_2$ is purged by subjecting said stream to cooling to crystallize sulfate salt.

20. The process of claim 1 wherein the product stream derived from the water splitter is purged of sulfate by evaporating at least a portion of the stream to recover sulfate salt.

21. The process of claim 4 in which the water splitting is effected until stream A contains $HSO_4^-$, separating $SO_2$ from the water splitter product stream, treating the stream from which $SO_2$ has been removed with calcium base to produce calcium sulfate and soluble sulfate and lessening the calcium concentration in solution by further treatment of the solution with a carbonate or sulfite.

22. The process of claim 18 in which the soluble sulfate is selected from the group of $Na_2SO_4$, $K_2SO_4$, and $(NH_4)_2SO_4$ and the base generated comprises a product selected from the group consisting of NaOH, KOH, $NH_4OH$, a mixture of NaOH and $Na_2SO_3$, KOH and $K_2SO_3$, $NH_4OH$ and $(NH_4)_2SO_3$, $Na_2SO_3$, $K_2SO_3$ or $(NH_4)_2SO_3$, a mixture of $Na_2SO_3$ and $NaHSO_3$, $K_2SO_3$ and $KHSO_3$ or $(NH_4)_2SO_3$ and $NH_4HSO_3$ and the calcium base is lime or limestone.

23. The process of claim 2 wherein the solution subjected to electrodialytic water splitting contains at least 0.1 equivalents/liter of a salt which is incapable of generating $SO_2$ when subjected to said water splitting.

24. The process of claim 23 wherein the salt is an alkali metal sulfate or ammonium sulfate.

25. A process for removing $SO_2$ from a gas which comprises (a) absorbing $SO_2$ from said gas with a basic aqueous solution containing cations which extracts the $SO_2$ from the gas and forms substantially soluble sulfites and bisulfites, (b) dividing said solution and (c) generating $SO_2$ and an aqueous solution capable of absorbing $SO_2$ from the $SO_2$-containing solution by subjecting said divided solution to electrodialytic water splitting.

* * * * *